United States Patent
Kim et al.

(10) Patent No.: US 11,720,658 B2
(45) Date of Patent: *Aug. 8, 2023

(54) METHOD AND APPARATUS OF PERFORMING AUTHENTICATION

(71) Applicant: Samsung Electronics Co., Ltd., Suwon-si (KR)

(72) Inventors: Jihye Kim, Anyang-si (KR); Seungju Han, Seoul (KR); Jaejoon Han, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

This patent is subject to a terminal disclaimer.

(21) Appl. No.: 17/359,968

(22) Filed: Jun. 28, 2021

(65) Prior Publication Data

US 2021/0334350 A1 Oct. 28, 2021

Related U.S. Application Data

(63) Continuation of application No. 16/250,276, filed on Jan. 17, 2019, now Pat. No. 11,048,785.

(30) Foreign Application Priority Data

Feb. 14, 2018 (KR) .......... 10-2018-0018226
Mar. 5, 2018 (KR) .......... 10-2018-0025558

(51) Int. Cl.
*G06F 21/00* (2013.01)
*G06F 21/32* (2013.01)
*H04W 12/30* (2021.01)

(52) U.S. Cl.
CPC .......... *G06F 21/32* (2013.01); *H04W 12/30* (2021.01)

(58) Field of Classification Search
None
See application file for complete search history.

(56) References Cited

U.S. PATENT DOCUMENTS

2014/0376787 A1 12/2014 Hirai
2015/0254498 A1 9/2015 Chiang et al.
(Continued)

FOREIGN PATENT DOCUMENTS

JP 2006-178651 A 7/2006
JP 4617121 B2 1/2011
(Continued)

OTHER PUBLICATIONS

Korean Office Action dated Jul. 6, 2022, in counterpart Korean Patent Application No. 10-2018-0025558 (6 pages in English and 8 pages in Korean).

*Primary Examiner* — Andrew J Steinle
(74) *Attorney, Agent, or Firm* — NSIP Law

(57) ABSTRACT

A processor-implemented method of performing authentication includes obtaining a first biometric information of a user according to a first modality; calculating a first score based on the first biometric information; filtering the first score; determining whether the filtered first score satisfies a second condition; and selectively, based on a result of the determining, authenticating the user based on the first score and a first condition corresponding to the first modality. The second condition is different from the first condition.

21 Claims, 13 Drawing Sheets

(56) References Cited

U.S. PATENT DOCUMENTS

| | | | |
|---|---|---|---|
| 2016/0019421 A1* | 1/2016 | Feng | G06V 40/18 |
| | | | 382/117 |
| 2017/0039357 A1* | 2/2017 | Hwang | G06K 9/6293 |
| 2017/0235931 A1* | 8/2017 | Publicover | H04L 63/0861 |
| 2017/0339137 A1 | 11/2017 | Vanoni et al. | |

FOREIGN PATENT DOCUMENTS

| | | |
|---|---|---|
| JP | 2012-160212 A | 8/2012 |
| JP | 2014-116033 A | 6/2014 |
| KR | 10-1054331 B1 | 8/2011 |
| KR | 10-1094763 B1 | 12/2011 |
| KR | 10-2014-0012474 A | 2/2014 |
| KR | 10-1443031 B1 | 9/2014 |
| KR | 10-2016-0045371 A | 4/2016 |

\* cited by examiner

METHOD AND APPARATUS OF PERFORMING AUTHENTICATION

CROSS-REFERENCE TO RELATED APPLICATIONS

This application is a continuation application of U.S. patent application Ser. No. 16/250,276, filed on Jan. 17, 2019, which claims the benefit under 35 USC § 119(a) of Korean Patent Application No. 10-2018-0018226 filed on Feb. 14, 2018 and Korean Patent Application No. 10-2018-0025558 filed on Mar. 5, 2018 in the Korean Intellectual Property Office, the entire disclosures of which are incorporated herein by reference for all purposes.

BACKGROUND

1. Field

The following description relates to a method and apparatus for performing authentication.

2. Description of Related Art

With the development of various mobile devices including smart phones, and user devices such as wearable devices, the significance of secure authentication is increasing, and the interest in biometric authentication is also growing sharply. Biometric authentication enhances the security of a user device and enables safer use of various application programs such as a mobile payment application. Biometric authentication exhibits a relatively high recognition rate and thus, is widely used.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a processor-implemented method of performing authentication includes obtaining a first biometric information of a user according to a first modality; calculating a first score based on the first biometric information; filtering the first score; determining whether the filtered first score satisfies a second condition; and selectively, based on a result of the determining, authenticating the user based on the first score and a first condition corresponding to the first modality. The second condition is different from the first condition.

The first modality may be an iris modality of the user and the first condition may be a first score threshold.

The second condition may be a filtered first score threshold.

The first score may be a score of a first frame of a plurality of frames corresponding to the first modality, and the filtering of the first score may include filtering the first score based on scores of frames adjacent to the first frame.

The first score may include a score calculated based on a combination of a plurality of features of the first modality.

The performing of the authentication using the first modality may include determining, in response to the first score satisfying the second condition, whether the first score satisfies the first condition; and validating the authentication in response to the first score satisfying the first condition.

In another general aspect, a processor-implemented method of performing authentication includes obtaining a first biometric information of a user according to a first modality among modalities; calculating a first score based on the first biometric information; determining whether the first score satisfies a first condition corresponding the first modality, the first condition being a condition for an exclusive authentication according to the first motility; based on a result of the determining, filtering the first score, and selectively, based on whether the filtered first score satisfies a second condition, authenticating the user based on consideration of plural scores respectively calculated according to plural modalities for a complex authentication. The second condition is different from the first condition for a primary authentication of the first modality.

In response to the determining indicating that the first score satisfies the first condition, the user may be authenticated.

The first modality may be an iris modality of a user, the first condition may be a first score threshold, and the second condition may be a filtered first score threshold.

The complex authentication may be any two or more of a fingerprint modality, an iris modality, and a face modality of a user.

The first score may be a score of a first frame of a plurality of frames corresponding to the first modalities, and the filtering of the first score may include filtering the first score based on scores of frames adjacent to the first frame.

The first score may include a score calculated based on a combination of a plurality of features of the first modality.

The filtering of the first score may include performing the primary authentication using the first score; and filtering the first score in response to the primary authentication failing.

The method may further include calculating a second score based on a second biometric information of the user according to a second modality different from the first modality and filtering the second score. The combination of the modalities may include the first modality and the second modality.

The authenticating of the user based on consideration of the plural scores respectively calculated according to the plural modalities may include calculating a third score by fusing the first score and the second score; and performing the complex authentication based on whether the third score satisfies a third condition for the complex authentication.

The authenticating of the user based on consideration of the plural scores respectively calculated according to the plural modalities may include performing, in response to the filtered first score satisfying the second condition, the authentication based on whether at least one of the first score and the second score satisfies the first condition.

The authenticating of the user based on consideration of the plural scores respectively calculated according to the plural modalities may include performing, in response to the filtered first score satisfying the second condition, the authentication based on whether at least one of the filtered first score and the second score satisfies the first condition.

The authenticating of the user based on consideration of the plural scores respectively calculated according to the plural modalities may include performing, in response to the filtered first score satisfying the second condition, the authentication based on whether at least one of the first score and the filtered second score satisfies the first condition.

The authenticating of the user based on consideration of the plural scores respectively calculated according to the plural modalities may include performing, in response to the filtered first score satisfying the second condition, the authentication based on whether at least one of the filtered first score and the filtered second score satisfies the first condition.

The authenticating of the user based on consideration of the plural scores respectively calculated according to the plural modalities may include performing the authentication based on whether a combination of the filtered first score and the filtered second score satisfies the second condition or whether the filtered second score satisfies the second condition.

In response to the combination of the filtered first score and the filtered second score satisfying the second condition or in response to the filtered second score satisfying the second condition, the performing of the authentication may include performing the authentication based on whether the non-filtered first score and the second score satisfy the first condition.

In response to the combination of the filtered first score and the filtered second score satisfying the second condition or in response to the filtered second score satisfying the second condition, the performing of the authentication may include performing the authentication based on whether the filtered first score and the second score satisfy the first condition.

In response to the combination of the filtered first score and the filtered second score satisfying the second condition or in response to the filtered second score satisfying the second condition, the performing of the authentication may include performing the authentication based on whether the first score and the filtered second score satisfy the first condition.

In response to the combination of the filtered first score and the filtered second score satisfying the second condition or in response to the filtered second score satisfying the second condition, the performing of the authentication may include performing the authentication based on whether the filtered first score and the filtered second score satisfy the first condition.

The modalities may include any one or any combination of any two or more of a face image, a fingerprint image, an iris image, a vein image, a palm-line image, a sign, a voice, a gait, a deoxyribonucleic acid (DNA) structure of a user.

A non-transitory computer-readable storage medium storing instructions that, when executed by a processor, may cause the processor to perform the method described above.

In another general aspect, an apparatus for performing authentication includes a processor configured to: obtain a first biometric information of a user according to a first modality; calculate a first score based on the first biometric information; filter the first score; determine whether the filtered first score satisfies a second condition; and selectively, based on a result of the determine, authenticate the user based on the first score and a first condition corresponding to the first modality. The second condition is different from the first condition.

The first modality may be an iris modality of the user and the first condition may be a first score threshold.

In another general aspect, an apparatus for performing authentication includes a processor configured to: obtain a first biometric information of a user according to a first modality among modalities; calculate a first score based on the first biometric information; determine whether the first score satisfies a first condition corresponding the first modality, the first condition being a condition for an exclusive authentication according to the first motility; based on a result of the determine, filter the first score and selectively, based on whether the filtered first score satisfies a second condition, authenticate the user based on consideration of plural scores respectively calculated according to plural modalities for a complex authentication. The second condition is different from the first condition for a primary authentication of the first modality.

The first modality may be an iris modality of a user, the first condition may be a first score threshold, the second condition may be a filtered first score threshold, and the complex authentication may be any two or more of a fingerprint modality, an iris modality, and a face modality of a user.

Other features and aspects will be apparent from the following detailed description, the drawings, and the claims.

Figure 1:
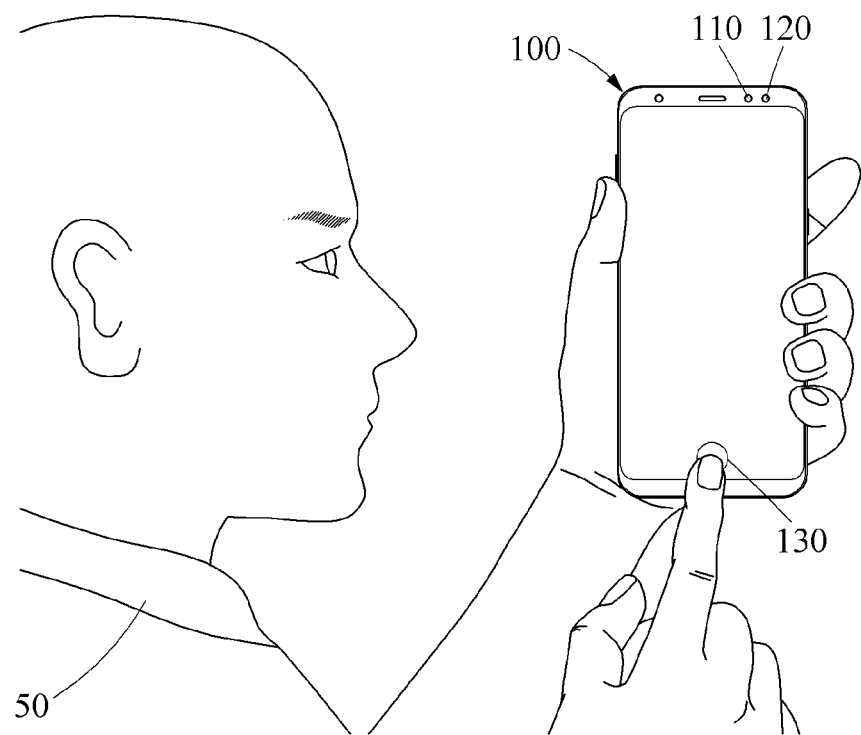
FIG. 1 illustrates an example of a situation in which authentication is performed.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Examples set forth hereinafter may be implemented as any of various types of products such as a personal computer, a laptop computer, a tablet computer, a smart phone, a television, a smart home appliance, an intelligent vehicle, a kiosk, and a wearable device. For example, the examples may be applied to a smart phone, a mobile device, a smart home system, an intelligent vehicle, and an automated teller machine (ATM) for user authentication. Also, the examples may be applied to an intelligent automobile system that automatically authenticates a user and starts a vehicle. Hereinafter, the examples will be described in detail with reference to the accompanying drawings, wherein like drawing reference numerals are used for like elements.

FIG. 1 illustrates an example of a situation in which authentication is performed. Referring to FIG. 1, a situation in which a user 50 performs a biometric recognition and/or authentication using an infrared (IR) sensor 110, an image sensor 120, and/or a fingerprint sensor 130 of a mobile device 100 is illustrated.

In an example, the biometric recognition or authentication is performed using a plurality of modalities based on various biometrics such as a face, an iris, a fingerprint, and a vein. The term "modalities" refer to unique biometric information of a user such as, for example, a face, a fingerprint, an iris, a vein, a palmprint, a signature, a voice, a gait, and a deoxyribonucleic acid (DNA) structure of the user, or various aspects that represent unique information to be used to recognize or authenticate the user. As further discussed below, in terms of the authentication, an exclusive or primary authentication is performed using a single modality or a complex authentication is performed using a plurality of modalities.

When using various biometric information, the security level of the biometric authentication varies for each modality. For example, an iris modality has a false acceptance rate (FAR) of one ten-millionth, and a fingerprint modality and a face modality each have a FAR of one millionth. The "'FAR" refers to a rate of misrecognizing biometric information of another person as biometric information of one person. As the FAR of a modality concerning biometric information decreases, the security, that is, a security level, of the modality increases.

The various biometric information is acquired by, for example, the IR sensor 110 and/or the image sensor 120. The IR sensor 110 acquires various biometric information by emitting light of an infrared light emitting diode (LED) (not shown). Also, the image sensor 120 captures a two-dimensional (2D) image or a three-dimensional (3D) image. For example, the image sensor 120 captures a color image or a black-and-white image, or a depth image.

The IR sensor 110 and/or the image sensor 120 capture images in units of frame. When the user 50 attempts unlocking a device, for ease of use of the user 50, the mobile device 100 acquires information on a plurality of consecutive images in a short period of time in units of frame. When image information is acquired in units of frame, the quality of the image information is affected by various capturing situations that the user 50 may have been involved such as effects of illumination, eye-blinking, movements of the user 50, and the eye size of the user 50. Thus, an appropriate criterion, for example, a threshold for determining whether to authenticate the user 50 is required for accurate authentication.

For example, when determining which of the authentications of multiple users to accept as authentic using scores of frames, for example, a matching score or a distance score inversely proportional to the matching score, the mobile device 100 determines whether to perform authentication based on a threshold. The matching score corresponds to a score representing how similar a registered frame and an input frame are to each other, that is, the similarity between the frames. A low matching score indicates a low similarity between the frames, and a high matching score indicates a high similarity between the frames. The higher matching score, the higher probability the mobile device 100 accepts the corresponding authentication of the user 50. Further, the distance score corresponds to a score representing a feature distance, for example, a Euclidean distance, between the registered frame and the input frame. A low distance score indicates a short feature distance between the frames in a feature vector space, and a high distance score indicates a long feature distance between the frames. The lower distance score, the higher probability the mobile device 100 accepts authentication of the user 50.

A score for determining whether to perform authentication is filtered, and a threshold is set to be an appropriate value corresponding to the filtered score. Through the filtering, a mis-authentication due to an outlier is prevented, and the level of security is maintained by blocking access to other people or objects. Also, based on an appropriately set threshold, access of an identified user or an object to be authenticated is maximally allowed resulting in low false denials of the user 50. The mobile device 100 may determine a lower reference value of a matching score or an upper reference value of a distance score to be the threshold.

In a recognition or authentication system receiving data in units of frame, scores of neighboring frames are used to improve the accessibility of an identified user while preventing entry attempts of false objects or users attempting false authentication. The mobile device 100 performs authentication using filtered scores of neighboring frames or uses the filtered scores to determine whether to enter the authentication before determining whether to authenticate, thereby excluding the possibility of a mis-authentication acceptance due to a fluctuation of a score.

The filtered score is directly used for the authentication and/or recognition. The filtered score is also used for removing an outlier, for example, as authentication entry condition for determining whether to perform the authentication and/or recognition.

The filtered score is used to increase the user convenience level by lowering the threshold for authentication and/or recognition such that the user easily accesses a user's device. Also, the filtered score is used to remove an outlier and effectively block access of another user, thereby maintaining security.

For brevity, the following description will be provided based on a situation in which an iris authentication is performed using an iris modality as an example. However, a type of a modality is not limited to the example. Instead, various modalities may be used alone and/or in combination for the authentication and/or recognition.

To perform the iris authentication, iris data is enrolled in a device requiring the iris authentication, for example, the mobile device 100 or a system. The iris image is captured while the user 50 is looking at and keeping a predetermined distance from the mobile device 100. The captured iris image is stored in the mobile device 100 or in an external source of the mobile device 100 in the form of computer-readable feature information, for example, a feature vector through conversion. The iris image is captured using, for example, the IR sensor 110. The iris image may be captured directly by the mobile device 100 or received from an external source of the mobile device 100.

Figure 12:
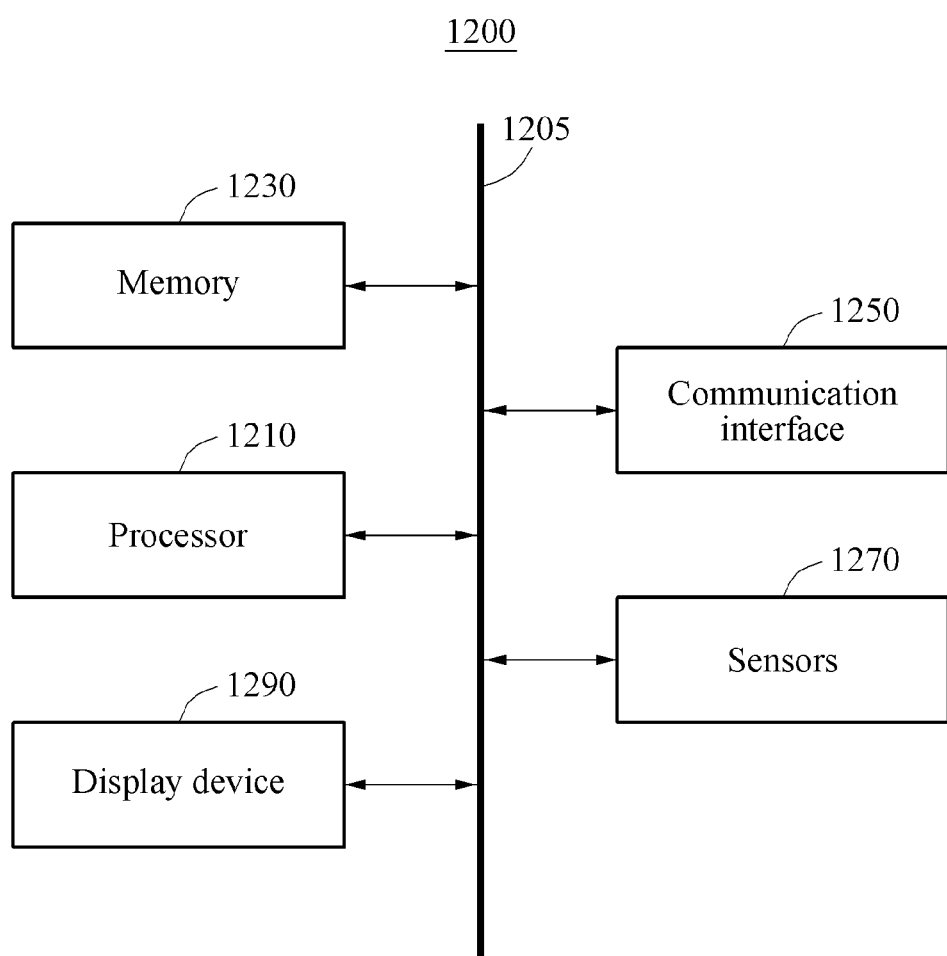
FIG. 12 illustrates an example of an apparatus for performing authentication.

When the user 50 attempts to unlock the mobile device 100, the mobile device 100 compares enrolled feature vectors stored in its memory, for example, the memory 1230 of FIG. 12 into which captured iris images are converted to authenticate and/or recognize the user 50.

The aforementioned score- and/or filtered score-based authentication scheme is also applicable to an exclusive or primary authentication scheme using a modality and a complex authentication scheme using a plurality of modalities.

In an example, the mobile device 100 acquires a plurality of items of image information and/or voice information. In this example, image information includes various biometric images such as an iris image and/or a face image. As such, when performing a complex authentication using a combination of various modalities, it is possible to increase the security of a device based on the advantage of each modality. Also, the complex authentication using a combination of modalities may ensure availability and accurate authentication performance for various situations including environmental conditions.

For example, the user 50 is authenticated using an iris image captured using the IR sensor 110 and a face image captured using the image sensor 120.

Regarding the iris image, the image quality may be degraded due to strong external infrared light. In such a case, the iris image and the face image may be used to perform the authentication. Unlike the iris image, the face image may be vulnerable to, for example, a change in the type of external light or low-illuminance situation, or a facial pose change. In such case as well, using the face image and the iris image together, the user 50 may be authenticated robustly against less than optimal environmental conditions such as outdoor, low-illuminance, and other various light changes. As such, a complex authentication using a combination of modalities may ensure authentication performance for various situations.

In another aspect, the complex authentication using a combination of modalities may improve the accessibility of a user 50 to a device and ensure a high level of security by determining which modality, having a relatively high level of security among different modalities, to use during authentication.

In addition, when performing a complex authentication, an entry of the complex authentication is restricted by the modality having the relatively high level of security, thereby preventing false authentication due to falsification of a particular modality and excluding a possibility of accepting a false authentication of another person. Also, using various modalities, authentication and recognition performance of a user 50 may be maintained in various environments, thereby improving the user's 50 satisfaction.

Figure 2:
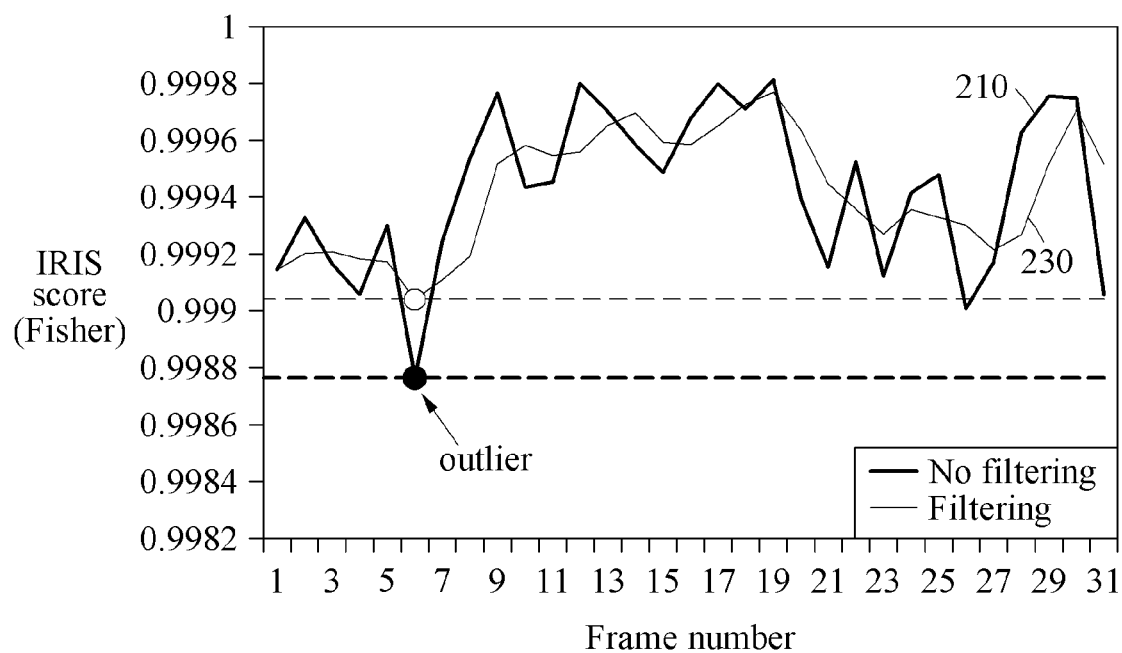
FIG. 2 illustrates an example of a method of performing authentication.

FIG. 2 illustrates an example of a method of performing authentication. Referring to FIG. 2, a change in an iris score for each frame in a case in which another user attempts at an iris authentication using a sequence including a plurality of frames, for example, 30 frames is depicted. In the example of FIG. 2, a score 210 is an original score "o" that is not filtered and a score 230 is a filtered score "f." The score 210 and the score 230 are, for example, a distance score, and correspond to the other user when having a value approximate to "1" and correspond to a user when having a value approximate to "0".

The score 210 is, for example, a fisher score generated based on a combination of various scores representing a quality of an iris image as well as a hamming distance of an iris.

In response to a change in one of the frames, as shown in frame 6, a fluctuation in which a score drastically changes inconsistently with scores of neighboring frames occurs. In this example, the drastically changing score corresponds to noise or an outlier. Here, the term "outlier" is understood as a frame or an image corresponding to the other user although the authentication succeeds.

When setting a threshold to block the outlier such as the score of the frame 6, a threshold is determined to be a low score less than or equal to, for example, 0.9988 to authenticate the user. The threshold corresponding to such a low score is applied to the user as a strict criterion, and thus, accessibility of the user is also reduced.

In an example, an influence of the outlier frame such as frame 6 of the other user on the setting of the threshold may be reduced by filtering the scores in units of frame in temporal order. For example, an original score of the frame 6 is 0.9988, and a filtered score of the frame 6 is 0.999. In this example, it is shown that the threshold for the authentication is lowered through the filtering in comparison to a previous threshold.

In an aspect, it is possible to effectively block access of another person to a device, thereby securing the device. Also, it is possible to increase a user's satisfaction by improving authentication and/or recognition performance such that a user can easily access his/her own device.

The filtered score may be directly used for the authentication and/or recognition, removing an outlier, and determining whether to enter authentication and/or recognition system. Various schemes may be applied to filter scores or values used for the authentication. For example, a simple moving average (SMA) technique for calculating an average value of frames sequentially input over time, a weighted moving average technique for calculating an average value of frames by assigning a high weight to a most recently input frame, an exponential smoothing technique for assigning a weight for a frame using an exponential function, or a simple average technique for averaging frames may be employed. In addition, various statistic calculation methods using a maximum value and a minimum value may be employed. Depending on a filtering method, the authentication apparatus stores a score of a previous frame in addition to a score of a current frame.

Figure 3:
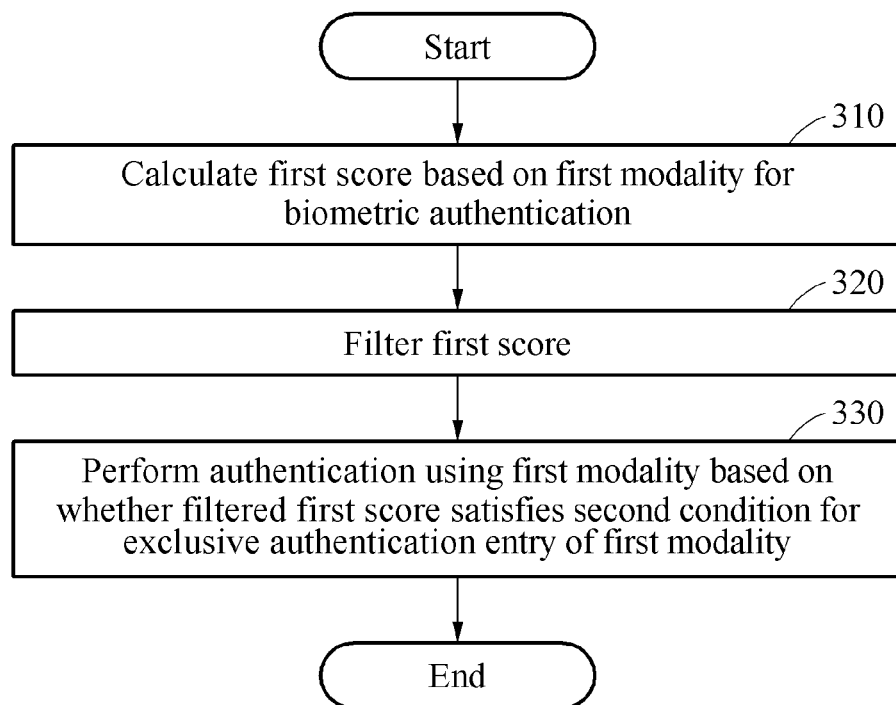
FIGS. 3 and 4 illustrate examples of a method of performing authentication.

FIG. 3 illustrates an example of a method of performing authentication. Referring to FIG. 3, a process of performing an exclusive or primary authentication using authentication apparatus is illustrated.

In operation 310, the authentication apparatus calculates a first score based on a first modality for a biometric authentication. The first score is a score of a first frame, for example, a current frame of a corresponding frame of a sequence including a plurality of frames corresponding to the first modality. The first score includes a score corresponding to a combination of a plurality of features of the first modality. For example, when the first modality is an iris modality, a plurality of features corresponds to feature vectors such as a number of iris code bits, a pupil-to-iris ratio, a pupil size, and an iris size. Also, when the first modality is a face modality, a plurality of features corresponds to scores or feature vectors of a whole or partial face.

In operation 320, the authentication apparatus filters the first score. The authentication apparatus filters the first score based on scores of neighboring frames adjacent to the first frame. For example, the authentication apparatus filters the first score by applying, to the scores of the first frame and the neighboring frames, a simple moving average scheme, a weighted moving average scheme, an exponential smoothing scheme, and a simple average scheme.

For example, the first frame is a time frame t and the neighboring frames are a time frame t−1 and a time frame t−2. Also, a score of the time frame t is 0.23, a score of the time frame t−1 is 0.4, and a score of the time frame t−2 is 0.4.

The authentication apparatus filters the scores 0.23, 0.4, and 0.4 of the three frames and obtains 0.3433 (=1.03/3=(0.23+0.4+0.4)/3) using the simple average technique. The scores are, for example, distance scores.

In operation 330, the authentication apparatus performs authentication using the first modality based on whether the filtered first score satisfies a second condition for an exclusive or primary authentication entry of the first modality. Here, the second condition is different from a first condition for an exclusive or primary authentication of the first modality.

In this disclosure, the "first condition" corresponds to a threshold for performing authentication using an unfiltered score and is also referred to as authentication condition for an unfiltered score. Likewise, the "second condition" corresponds to a threshold for performing authentication or authentication entry using a filtered score and is also referred to as authentication condition or authentication entry condition for a filtered score. For example, the first condition corresponds to a threshold of 0.25 and the second condition corresponds to a threshold of 0.30.

The authentication apparatus performs the authentication using the first modality based on whether the first score (for example, 0.343) that is filtered in operation 320 satisfies the second condition (for example, whether the first score is less than 0.30). Since the filtered first score does not satisfy the second condition, the authentication apparatus determined that an entry for the authentication fails and, thus, does not perform the authentication using the first modality.

When the first score filtered in operation 320 satisfies the second condition, the authentication using the first modality is performed based on an unfiltered first score, for example, 0.23 that is an unfiltered score of the first frame.

In an example, whether the filtered first score satisfies the second condition is determined to allow the user to easily access a device, thereby improving a user's satisfaction. In addition, whether the filtered first score satisfies the second condition is determined to effectively block access of another user to the device, thereby securing the device.

The method of performing the authentication described with reference to FIG. 3 is also applicable to a complex authentication scheme. Hereinafter, a method of performing a complex authentication using a combination of modalities will be described with reference to FIG. 4.

Figure 4:
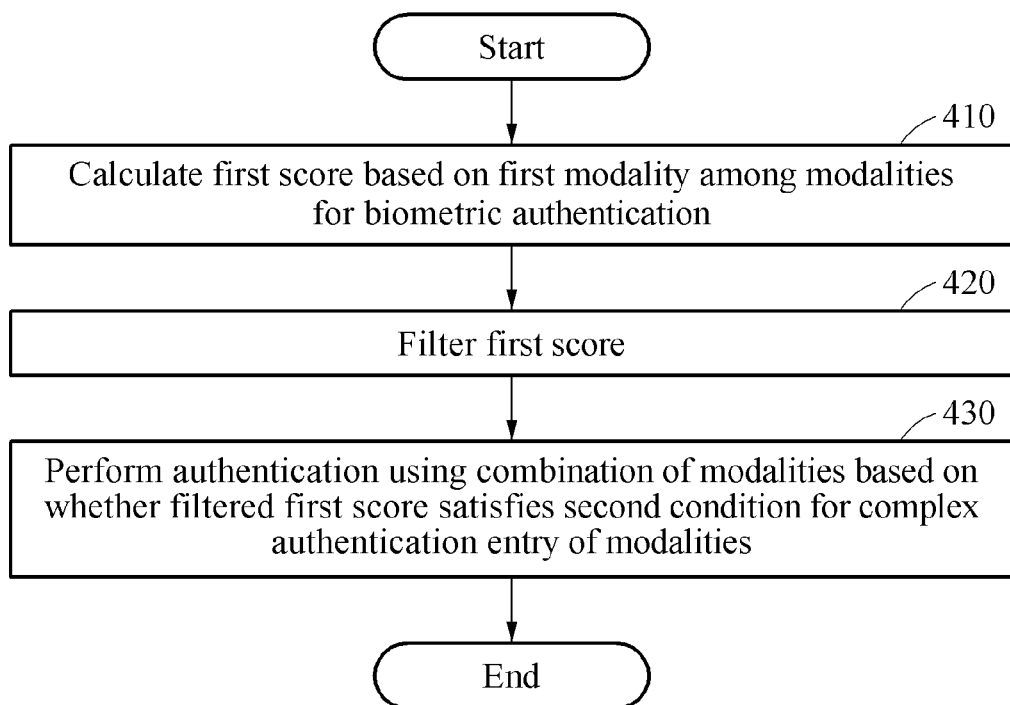

FIG. 4 illustrates an example of a method of performing authentication. Referring to FIG. 4, a process of performing a complex authentication using the authentication apparatus is illustrated.

In operation 410, the authentication apparatus calculates a first score based on a first modality among modalities for biometric authentication. The first score is a score of a first frame, for example, a current frame of a corresponding frame of a sequence including a plurality of frames corresponding to the first modality. The first score includes a score corresponding to a combination of a plurality of features of the first modality. For example, when the first modality is an iris modality, a plurality of features corresponds to feature vectors such as a number of iris code bits, a pupil-to-iris ratio, a pupil size, and an iris size. Also, when the first modality is a face modality, a plurality of features corresponds to scores or feature vectors of a whole or partial face.

In operation 420, the authentication apparatus filters the first score. The authentication apparatus filters the first score based on scores of neighboring frames adjacent to the first frame.

In operation 430, the authentication apparatus performs authentication using a combination of modalities based on whether the filtered first score satisfies a second condition for a complex authentication entry of the modalities. Here, the second condition is different from a first condition for an exclusive or primary authentication of the first modality. The combination of the modalities includes, for example, the first modality and a second modality different from the first modality. The first condition and the second condition will be further described with reference to FIGS. 5A and 5B.

Figure 5A:
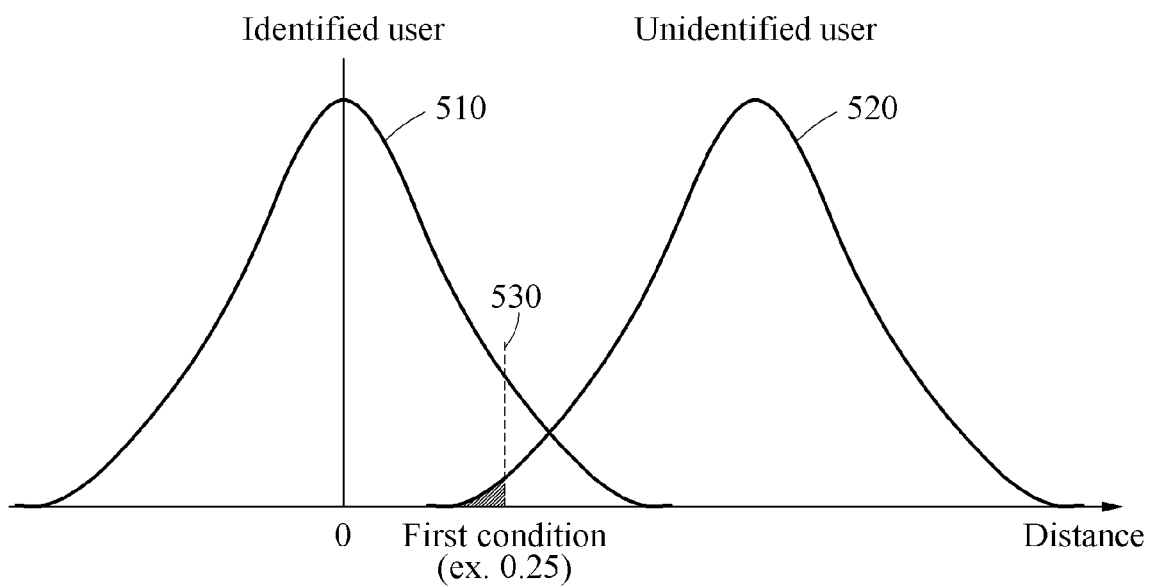
FIGS. 5A and 5B illustrate examples of a first condition and a second condition.
Figure 5B:
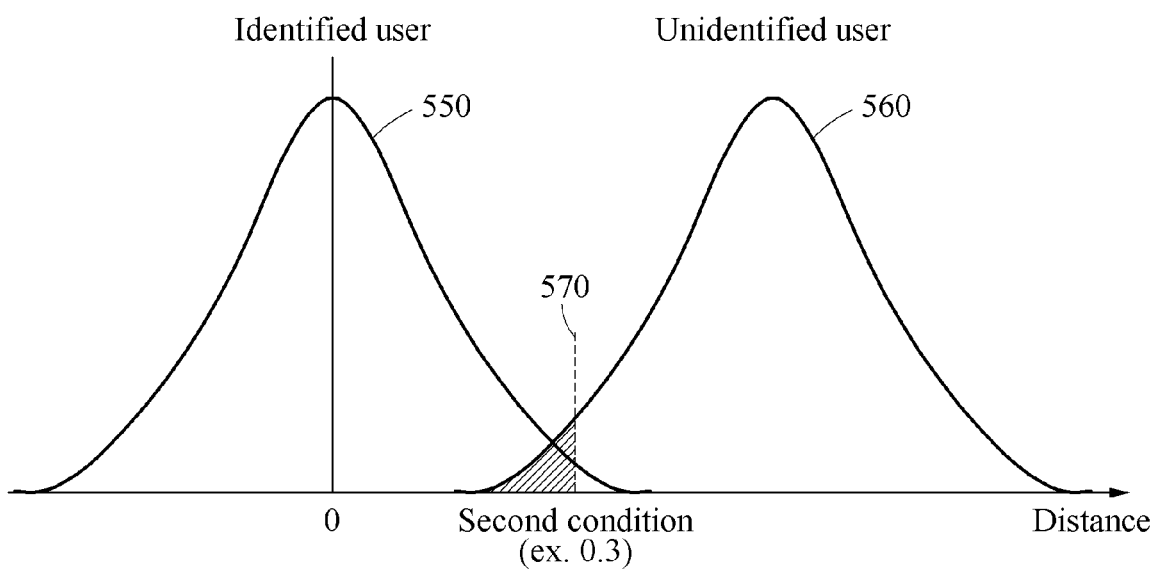

FIGS. 5A and 5B illustrate examples of a first condition and a second condition. As described above, the first condition corresponds to a threshold for performing authentication using an unfiltered score and the second condition corresponds to a threshold for performing authentication or determining whether to perform the authentication using a filtered score. The threshold is determined based on, for example, a verification rate (VR), a FAR, a false reject rate (FRR), or a combination thereof. Hereinafter, although a method of determining the first condition and the second condition based on the FAR as an example, a method of determining the first condition and the second condition is not limited to the example and thus, the first condition and the second condition may be determined based on various performance indices.

In a graph of FIG. 5A, the X axis represents a feature distance associated with a feature of a first modality and a Y axis represents a number of samples or frames corresponding to the feature distance.

Referring to FIG. 5A, a graph representing a first condition in a distribution of unfiltered scores is illustrated. A distribution histogram 510 represents a distribution of feature distances associated with a first modality, for example, an iris modality of a user. A distribution histogram 520 represents a distribution of feature distances associated with a first modality, for example, an iris modality of another user. In this example, the feature distance corresponds to a Euclidean distance between an input image and a registered image. The feature distance decreases as a similarity between images increases. Also, the feature distance increases as the similarity between the images decreases.

The authentication apparatus sets, to be the first condition, a feature distance corresponding to a boundary line 530 separating an area of a range by which authentication is accepted in the iris modality, for example, the bottom one ten-millionth of the entire area of the distribution histogram 520. When the feature distance of the iris modality does not satisfy a predetermined FAR, for example, a FAR of 1/10000000 or when the score of the iris modality does not satisfy a distance score of 0.25 corresponding to the predetermined FAR, an exclusive or primary authentication of a user fails. The first condition corresponds to authentication condition for the unfiltered score.

Referring to FIG. 5B, a graph representing a second condition in a distribution of filtered scores is illustrated. A distribution histogram 550 represents a distribution of feature distances associated with a first modality, for example, an iris modality of a user. A distribution histogram 560 represents a distribution of feature distances associated with a first modality, for example, an iris modality of another user.

The authentication apparatus sets, to be the second condition, a feature distance corresponding to a boundary line 570 separating an area of a range by which an advanced entry is accepted to determine whether to perform authentication associated with the filtered score of the iris modality, for example, the bottom one two-thousandth of the entire area of the distribution histogram 560. When the feature distance of the iris modality does not satisfy a predetermined FAR (a relatively low FAR compared to the first condition, for example, an FAR of 1/2000) or when the filtered score of the iris modality does not satisfy a distance score of 0.3 corresponding to the predetermined FAR, the authentication apparatus determines that authentication entry condition is not satisfied before determining whether to perform the authentication and thus, does not perform the authentication. The second condition corresponds to authentication entry condition for the filtered score.

For example, the first condition is a score of 0.25 corresponding to the FAR of 1/10000000 and the second condition is a score of 0.3 corresponding to the FAR of 1/2000. Another person attempts a face-based authentication using a frame at a time t−2 (score: 0.4), a frame at a time t−1 (score: 0.23), and a frame at a time t (score: 0.4) with the frame at the time t−1 being an outlier.

When only the first condition (for example, the authentication condition) is applied to the frame at the time t−1, the score, 0.23 of the frame at the time t−1 satisfies the first condition because 0.23 is less than 0.25 even though the authentication is of another person's; thus, incorrectly authenticating the device. See Table 1 below.

TABLE 1

| Time | t-2 | t-1 | t |
|---|---|---|---|
| Score (dist. basis) | 0.4 | 0.23 | 0.4 |
| Case in which only first condition is applied | Authentication fails | Authentication succeeds | Authentication fails |
| Case in which the second condition is determined, and then the first condition is applied | Entry fails 0.4 | Entry fails (0.4 + 0.23) / 2 = 0.31 | Entry fails (0.4 + 0.23 + 0.4) / 3 = 0.34 |

When the second condition (the authentication entry condition) is determined and then the first condition (the authentication condition) is determined, the filtered score, 0.31 of the frame at the time t−1 does not satisfy the second condition of being less than 0.3. In this example, the authentication apparatus determines that the authentication entry fails and does not apply or determine the first condition, thereby preventing authentication using the outlier.

In an example, authentication apparatus determines the first condition and the second condition based on various performance indices such as, for example, a normalized cross correlation (NCC), a matching score, or a similarity score between feature vectors, in addition to the feature distance.

In an example, the authentication apparatus determines the first condition and/or the second condition based on whether to emphasize security or convenience of an application.

For example, in a case in which a user is to execute a financial institution application such as a banking or stock trading application, the authentication apparatus determines the first condition such that a strict authentication is performed by emphasizing security. In a case in which the user is to unlock a mobile device to perform a simple function on the mobile device such as accessing a camera or memo application, the authentication apparatus may determine to forgo the first condition during authentication, or the authentication may be performed based on a new criterion that emphasizes convenience to the user.

In the foregoing example, the second condition is used as the threshold for determining whether to perform the exclusive or primary authentication. Depending on the example, the second condition is also used as a threshold for determining whether to perform a complex authentication.

For example, the iris modality is unsuitable for an outdoor environment with strong ultraviolet rays. In this example, even if the authentication using the iris modality fails, when the iris modality satisfies a predetermined condition, a face modality that is more suitable for the outdoor environment and the iris modality are used to perform a complex authentication. When the iris modality satisfies the feature distance of the boundary line 570 moderated from the feature distance of the boundary line 530, the authentication apparatus determines that the complex authentication is performed based on a combination of the iris modality and the face modality.

In an example, even if the exclusive authentication, using the iris modality, fails due to less than ideal environmental conditions when capturing the iris image, when the second condition is satisfied, the authentication apparatus allows the user to access using a combination of elements of the complex authentication, that is, modalities. The term "complex authentication" is understood as authentication performed using various combinations of modalities such as fingerprint and iris; fingerprint and face; iris and face; and fingerprint, iris, and face among a plurality of modalities. In other words, the combination of modalities may include any one or any two or more of a fingerprint, an iris, and a face.

Figure 6:
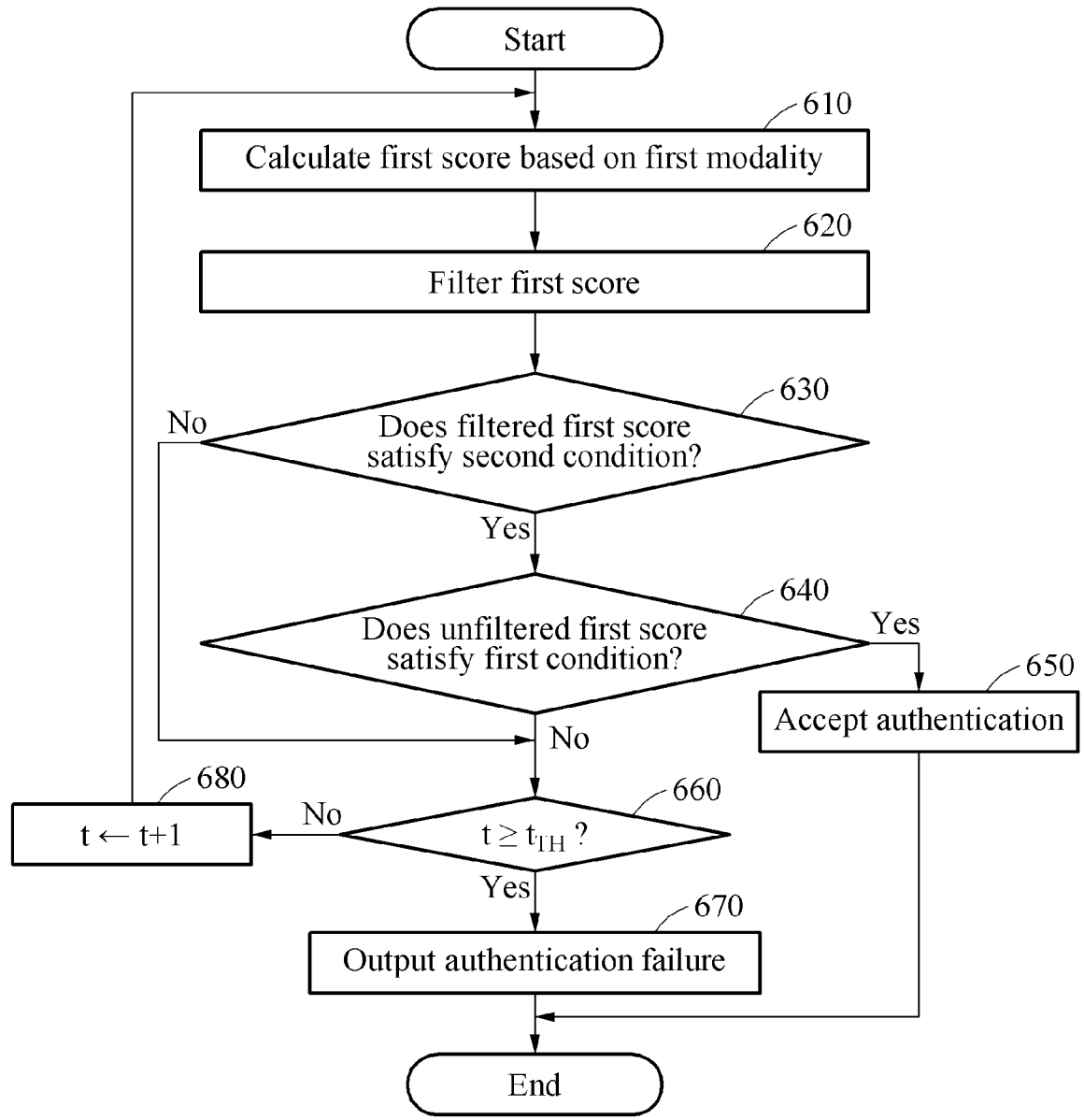
FIGS. 6 through 11 illustrate examples a method of performing an exclusive authentication or a complex authentication.

FIG. 6 illustrates an example of a method of performing authentication. Referring to FIG. 6, a process of performing, by authentication apparatus, an exclusive authentication using a first score based on a first modality is illustrated.

The authentication apparatus calculates a first score based on a first modality in operation 610 and filters the first score in operation 620.

In operation 630, the authentication apparatus determines whether the filtered first score satisfies a second condition for an exclusive authentication entry of the first modality. When it is determined that the filtered first score does not satisfy the second condition in operation 630, in operation 660, the authentication apparatus determines whether a current frame (for example, a $t^{th}$ frame) corresponds to a threshold number (for example, 30, $t_{TH}$) of frames set in advance. When it is determined that the current frame corresponds to a last frame (for example, a $30^{th}$ frame) of the set frames in operation 660, the authentication apparatus outputs authentication failure in operation 670.

When it is determined that the current frame does not correspond to the last frame of the set frames in operation 660, the authentication apparatus receives a subsequent frame in operation 680 and performs, on the subsequent frame, operation 610 and operations thereafter.

For example, the threshold number of the set frames is 30. In this example, the authentication apparatus determines whether to perform the authentication on 30 frames. When the authentication is not accepted for all of the 30 frames, the authentication apparatus displays "authentication failed" on a screen of a user terminal. When a $17^{th}$ frame is successfully authenticated, the authentication apparatus determines the authentication succeeds without a need to perform the authentication on remaining 13 frames and accepts the authentication. In another example, even when one of the frames is successfully authenticated, the authentication apparatus may not readily accept the authentication to achieve increased accuracy. Instead, when at least a preset number of frames, for example, two or three frames consecutively succeeds authentication, the authentication apparatus determines that the authentication succeeds and accepts the authentication.

The authentication apparatus may not output whether the authentication fails for each frame except for a case in which the corresponding frame is successfully authenticated. Also, the authentication apparatus outputs authentication result after determining whether to be authenticated for all of the threshold number of frames.

In an example, in operation 660, the authentication apparatus determines whether a preset time elapses instead of the preset threshold number of frames to determine whether the authentication fails. When the preset time (for example, $t_{TH}$=2 sec) elapses, the authentication apparatus outputs authentication failure. When a current time (for example, t=1 sec) less than the preset time elapses, the authentication apparatus performs operation 610 and operations thereafter on a $(t+1)^{th}$ frame corresponding to a subsequent time (for example, t=1.5 sec).

When it is determined that the filtered first score satisfies the second condition in operation 630, in operation 640, the authentication apparatus determines whether the first score that is not filtered satisfies the first condition. Hereinafter, the "first score that is not filtered" is also referred to as "unfiltered first score". When it is determined that the unfiltered first score does not satisfy the first condition in operation 640, in operation 670, the authentication apparatus outputs authentication failure through a determination similar to operation 660.

When it is determined that the unfiltered first score satisfies the first condition, the authentication apparatus accepts the authentication in operation 650.

In an example, the authentication apparatus determines whether the filtered first score satisfies the first score in operation 630 and, when the first condition is satisfied, accepts the authentication.

Figure 7:
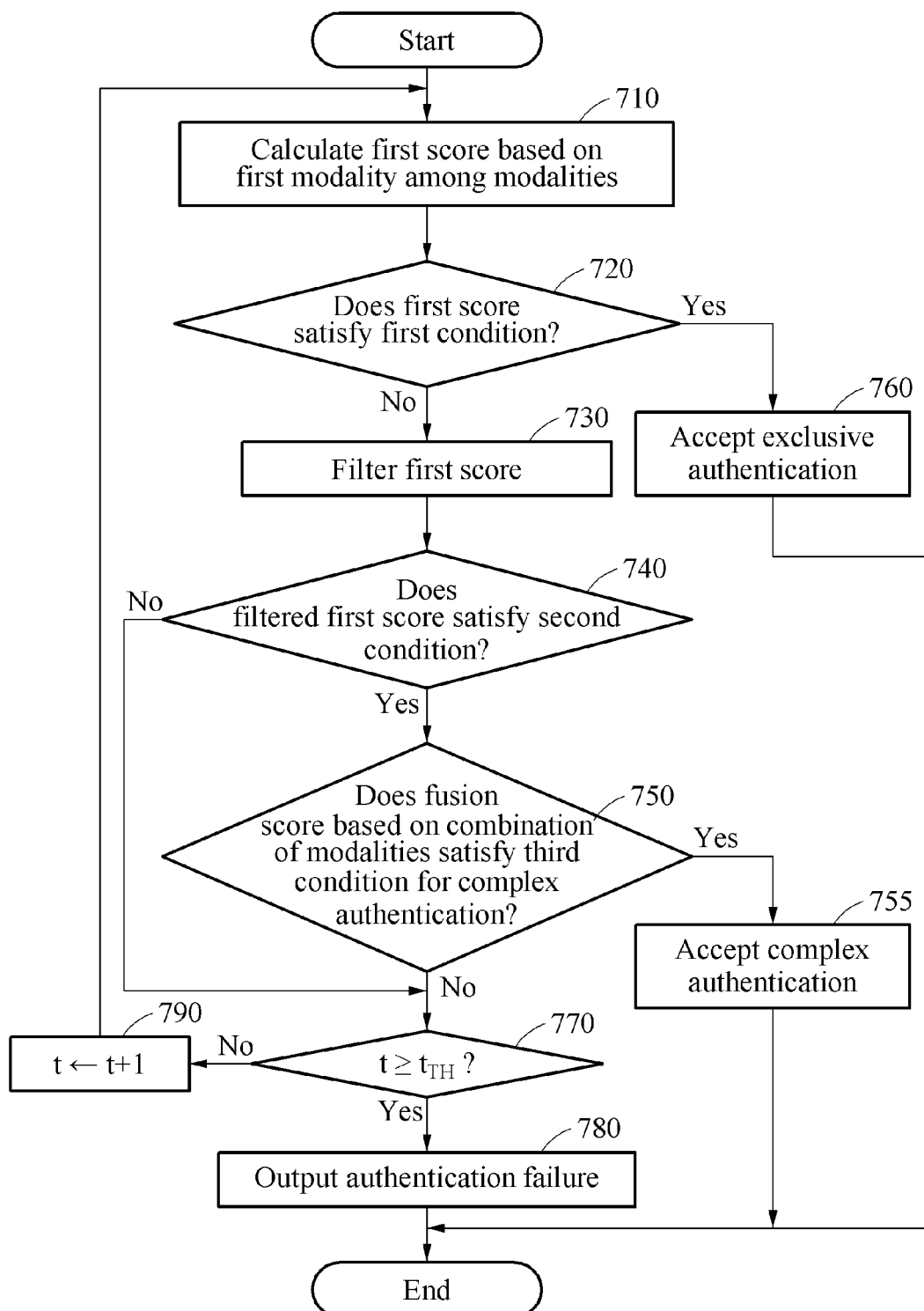

FIG. 7 illustrates an example of a method of performing authentication. Referring to FIG. 7, a process of performing, by authentication apparatus, performing a complex authentication is illustrated. The authentication apparatus calculates a first score based on a first modality among modalities in operation 710 and performs an exclusive authentication using the first score. In operation 720, the authentication apparatus determines whether the first score satisfies the first condition for the exclusive authentication to perform the exclusive authentication. When it is determined that the first score satisfies the first condition in operation 720, the authentication apparatus accepts the exclusive authentication in operation 760.

When it is determined that the first score does not satisfy the first condition in operation 720, the authentication apparatus filters the first score in operation 730.

In operation 740, the authentication apparatus determines whether the filtered first score satisfies a second condition. When it is determined that the filtered first score does not satisfy the second condition in operation 740, the authentication apparatus performs the same operation on a subsequent frame, or terminates an operation or outputs authentication failure when a corresponding frame is a last frame set in advance.

When it is determined that the filtered first score does not satisfy the second condition in operation 740, in operation 770, the authentication apparatus determines whether a current frame (for example, a $t^{th}$ frame) corresponds to a threshold number (for example, 30, $t_{TH}$) of frames set in advance. When it is determined that the current frame corresponds to a last frame (for example, a $30^{th}$ frame) of the set frames in operation 770, the authentication apparatus outputs authentication failure in operation 780.

When it is determined that the current frame does not correspond to the last frame of the set frames in operation 770, the authentication apparatus receives a subsequent frame in operation 790 and performs, on the subsequent frame, operation 710 and operations thereafter.

When it is determined that the filtered first score satisfies the second condition in operation 740, the authentication apparatus performs a complex authentication using a combination of modalities. When it is determined that the filtered first score satisfies the second condition in operation 740, in operation 750, the authentication apparatus determines whether a fusion score based on the combination of the modalities satisfies a third condition for the complex authentication. For example, in operation 750, the authentication apparatus calculates a fusion score by fusing filtered or unfiltered scores of the modalities. When it is determined that the fusion score does not satisfy the third condition for the complex authentication in operation 750, the authentication apparatus performs operation 770.

When it is determined that the fusion score satisfies the third condition for the complex authentication in operation 750, the authentication apparatus accepts the complex authentication in operation 755.

Figure 8:
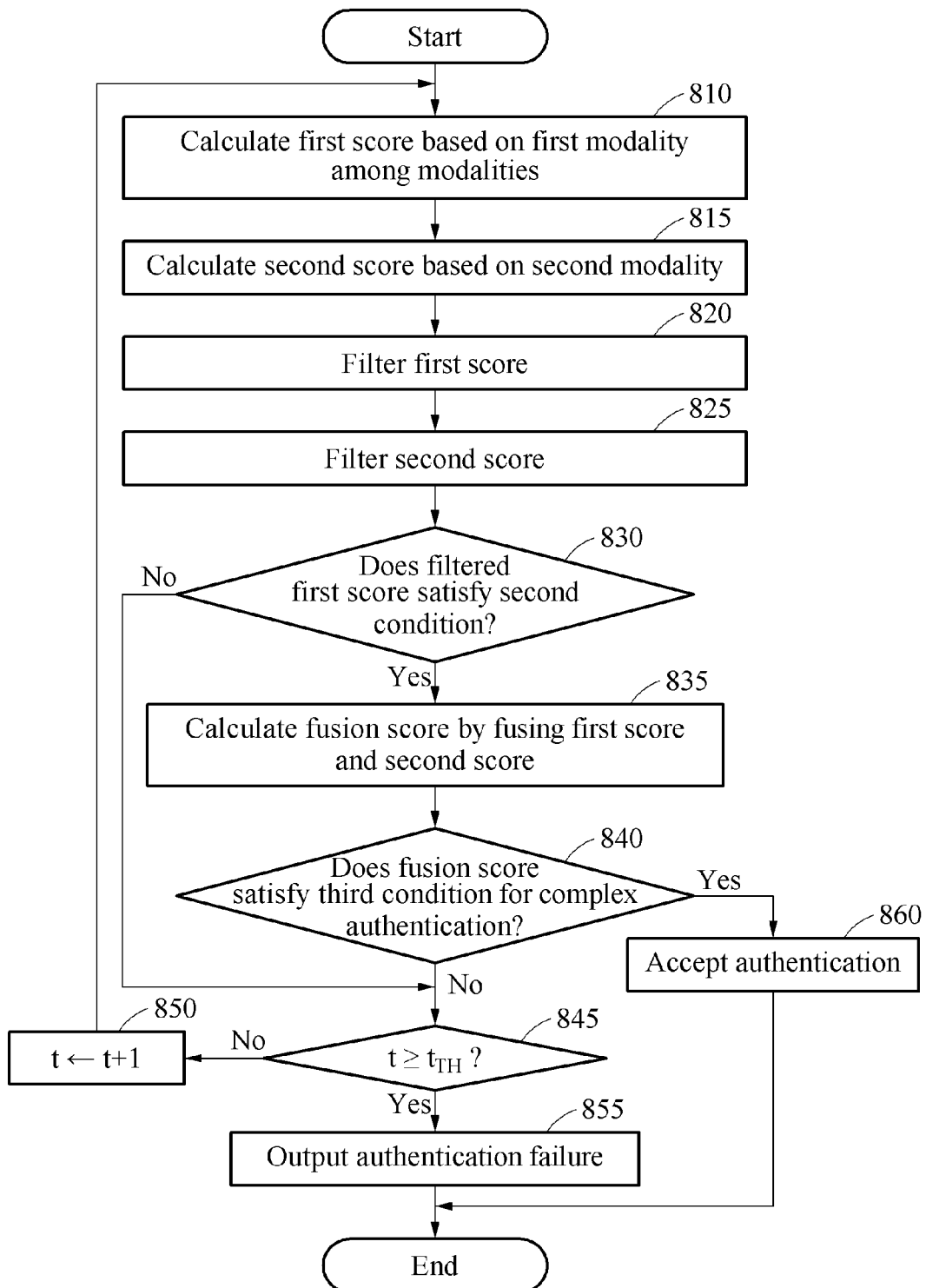

FIG. 8 illustrates an example of a method of performing authentication. Referring to FIG. 8, a process of performing a complex authentication using authentication apparatus is illustrated. In operation 810, the authentication apparatus calculates a first score based on a first modality among modalities. In operation 815, the authentication apparatus calculates a second score based on a second modality.

The authentication apparatus filters the first score in operation 820 and filters the second score in operation 825. For example, the authentication apparatus filters both of the first score and the second score, or filters the first score and does not filter the first score as necessary.

In operation 830, the authentication apparatus determines whether the filtered first score satisfies a second condition. When it is determined that the filtered first score does not satisfy the second condition in operation 830, in operation 845, the authentication apparatus determines whether a corresponding frame is a last frame, for example, $t \geq t_{TH}$. When it is determined the corresponding frame is the last frame in operation 845, the authentication apparatus outputs authentication failure in operation 855.

When it is determined that the filtered first score satisfies the second condition in operation 830, the authentication apparatus performs authentication using a combination of modalities. The authentication apparatus performs the authentication using various combinations of filtered or unfiltered scores. When it is determined that the filtered first score satisfies the second condition in operation 830, in operation 835, the authentication apparatus calculates a fusion score by fusing the first score and the second score. For example, in operation 835, the authentication apparatus calculates a fusion score by fusing the unfiltered first score and the unfiltered second score. Also, the authentication apparatus calculates a fusion score by fusing the filtered first score and the filtered second score, by fusing the filtered first score and the unfiltered second score, or by fusing the unfiltered first score and the filtered second score.

In operation 840, the authentication apparatus determines whether the fusion score calculated in operation 835 satisfies a third condition for a complex authentication. The authentication apparatus performs the complex authentication based on whether the fusion score satisfies the third condition for the complex authentication. Depending on examples, the third condition may be different from or the same as the first condition and/or the second condition. The authentication apparatus performs the complex authentication using a pre-trained classifier. In this example, a parameter learned by the classifier is determined based on a target level of a FAR of the authentication apparatus.

When it is determined that the fusion score does not satisfy the third condition in operation 840, in operation 845, the authentication apparatus determines whether a corresponding frame is a last frame of which an ordinal number corresponds to a preset number of frames, for example, $t \geq t_{TH}$. When it is determined that the corresponding frame is the last frame in operation 845, the authentication apparatus outputs authentication failure in operation 855. When it is determined that the corresponding frame (for example, the $t^{th}$ frame) is not the last frame in operation 845, the authentication apparatus receives a subsequent frame, for example, a $(t+1)^{th}$ frame in operation 850 and performs, on the subsequent frame, operation 810 and operations thereafter.

When it is determined that the fusion score satisfies the third condition, the authentication apparatus accepts the authentication in operation 860.

Figure 9:
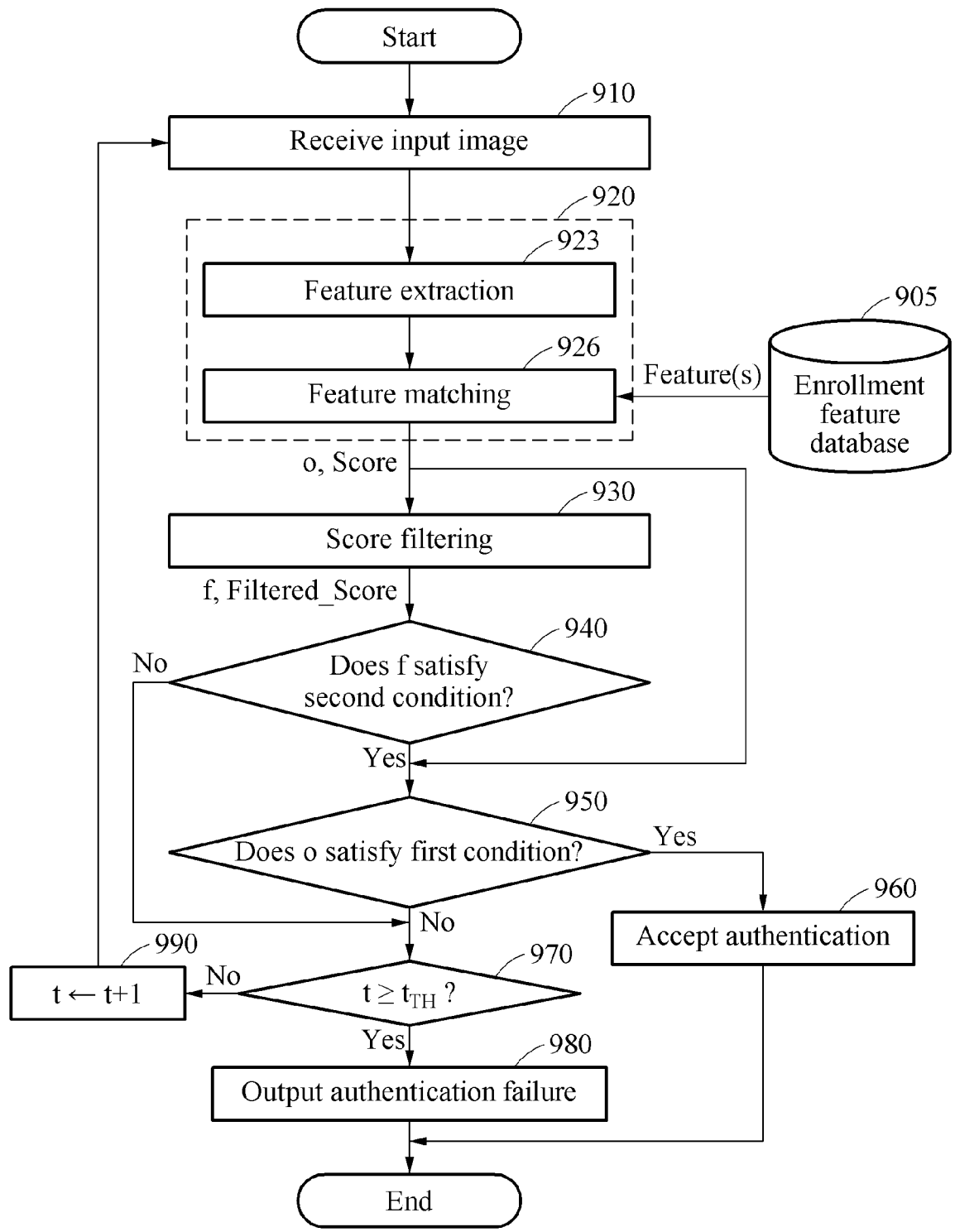

FIG. 9 illustrates an example of a method of performing authentication. Referring to FIG. 9, a process of performing, by authentication apparatus, an exclusive authentication using a first modality is illustrated.

In operation 910, the authentication apparatus receives an input image, for example, a $t^{th}$ frame of a first modality. In operation 920, the authentication apparatus calculates a first score from the input image based on the first modality. In operation 923, the authentication apparatus extracts feature vectors associated with the first modality from the input image. In operation 926, the authentication apparatus matches the extracted feature vectors and enrolled feature vectors for each modality stored in an enrollment feature database 905 to obtain a first score o.

In operation 930, the authentication apparatus filters the first score. In operation 940, the authentication apparatus determines whether a filtered first score f satisfies a second condition for an exclusive authentication entry of the first modality to determine whether to perform authentication at a security level. When it is determined that the filtered first score f does not satisfy the second condition in operation 940, in operation 970, the authentication apparatus determines whether the $t^{th}$ frame is a last frame of which an ordinal number corresponds to a preset number of frames, for example, $t \geq t_{TH}$. When the $t^{th}$ frame is determined to be the last frame, the authentication apparatus outputs authentication failure in operation 980. When it is determined that the $t^{th}$ frame is not the last frame in operation 970, the authentication apparatus receives a new input image, for example, a $(t+1)^{th}$ frame of the first modality in operation 910.

In an example, the authentication apparatus determines a condition corresponding to a preset time instead of a condition corresponding to the preset number of frames in operation 970. When the preset time for determining "authentication failure" is two seconds, for example, $t_{TH}=2$ sec, the authentication apparatus verifies an input of a first modality corresponding to a time t through an input of a first modality corresponding to a time t+2 sec.

When it is determined that the filtered first score satisfies the second condition in operation 940, in operation 950, the authentication apparatus determines whether an unfiltered first score, for example, the first score o calculated in operation 920 satisfies the first condition. When it is determined that the unfiltered first score does not satisfy the first condition, the authentication apparatus determines whether the $t^{th}$ frame is the last frame of which the ordinal number corresponds to the preset number of frames in operation 970. When the $t^{th}$ frame is determined to be the last frame, the authentication apparatus outputs authentication failure in operation 980. When it is determined that the $t^{th}$ frame is not the last frame in operation 970, the authentication apparatus receives a new input image, for example, the $(t+1)^{th}$ frame of the first modality in operation 910.

When it is determined that the unfiltered first score satisfies the first condition in operation 950, the authentication apparatus accept the authentication in operation 960.

Figure 10:
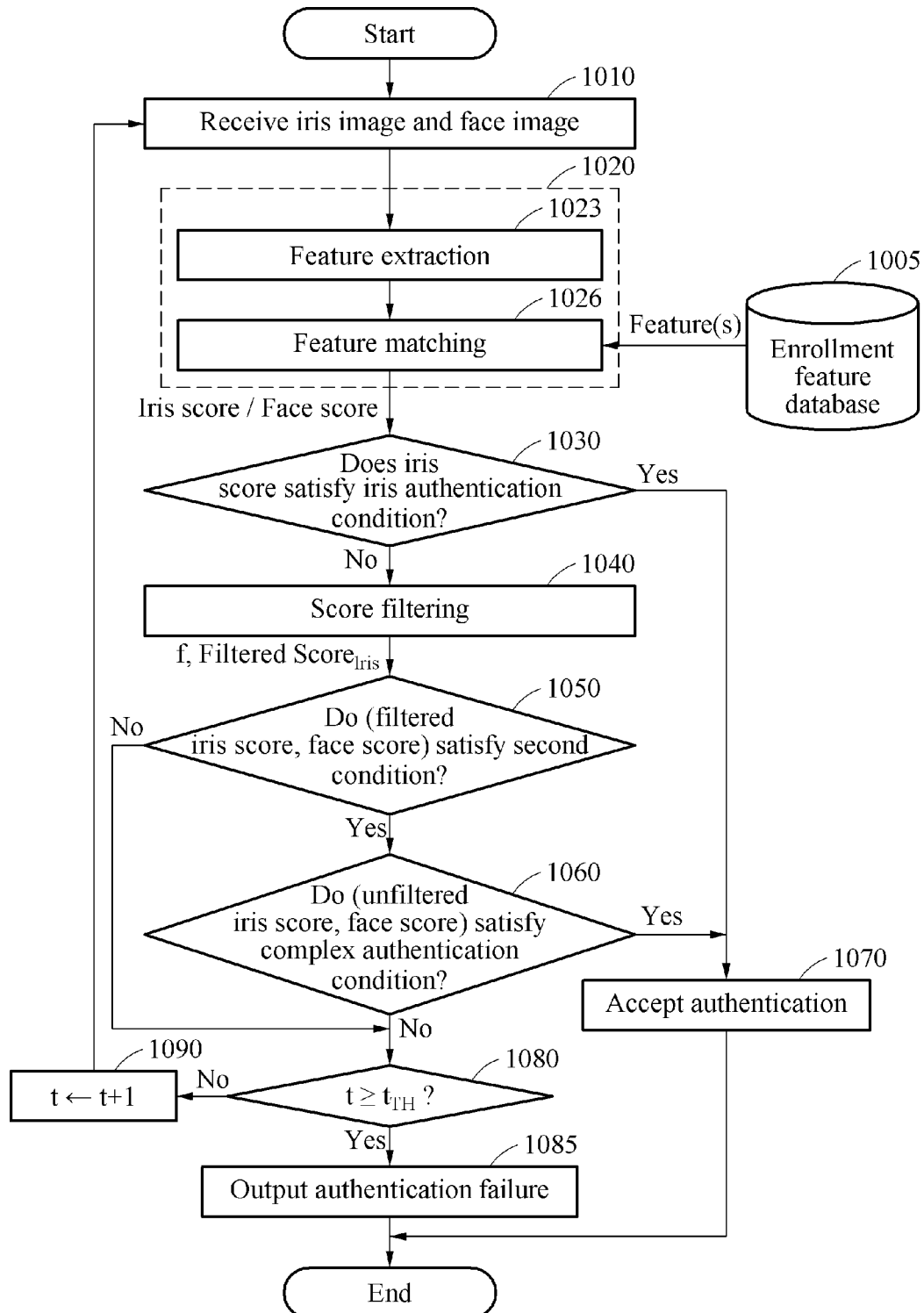

FIG. 10 illustrates an example of a method of performing authentication. Referring to FIG. 10, a process of performing a complex authentication on an iris corresponding to a first modality and a face corresponding to a second modality is illustrated.

In operation 1010, the authentication apparatus receives an iris image and a face image. The iris image includes data on the iris corresponding to the first modality. The face image includes data on the face corresponding to the second modality. The iris image is, for example, an infrared image. The face image is, for example, a color image, a block-and-white image, or a depth image. The face image is, for example, a 2D image or a 3D image. In FIG. 10, the iris image and the face image corresponds to a $t^{th}$ frame.

In operation 1020, the authentication apparatus calculates scores corresponding to the iris image and the face image. In operation 1023, the authentication apparatus extracts feature vectors corresponding to the first modality from the iris image and extracts feature vectors corresponding to the second modality from the face image.

In operation 1026, the authentication apparatus matches the feature vectors corresponding to the first modality and the feature vectors corresponding to the second modality to enrolled feature vectors for each modality stored in an enrollment database 1005 so as to obtain a first score, for example, an iris score based on the first modality and a second score, for example, a face score based on the second modality. Depending on examples, the authentication apparatus calculates the first score and then calculates the second score as necessary, or calculates the first score and the second score at one time.

In operation 1020, the authentication apparatus calculates scores for a plurality of features of each modality, for example, a number of iris code bits, a pupil-to-iris ratio, a pupil size, and an iris size of the iris modality.

In operation 1030, the authentication apparatus determines whether the iris score satisfies an iris authentication condition (for example, the first condition). When it is determined that the iris score satisfies the iris authentication condition in operation 1030, the authentication apparatus accepts the authentication in operation 1070.

When it is determined that the iris score does not satisfy the iris authentication condition, for example, an iris-exclusive authentication condition in operation 1030, the authentication apparatus filters the iris score 1040. The authentication apparatus filters the iris score using an average of iris scores corresponding to $t^{th}$, $(t-1)^{th}$, and $(t-2)^{th}$ iris images or frames. In an example, the authentication apparatus filters the iris score and the face score in operation 1040.

In operation 1050, the authentication apparatus determines "whether (the filtered iris score, the face score) satisfy the second condition." Here, it is understood that "whether (the filtered iris score, the face score) satisfy the second condition." includes "whether the filtered iris score satisfies the second condition," "whether the (unfiltered) face score satisfies the second condition," and "whether the filtered iris score and the (unfiltered) face score satisfy the second condition."

When it is determined that (the filtered iris score, the face score) do not satisfy the second condition in operation 1050, in operation 1080, the authentication apparatus determines whether the $t^{th}$ frame is a last frame of which an ordinal number corresponds to a preset number of frames, for example, $t \geq t_{TH}$. When it is determined that the $t^{th}$ frame is the last frame in operation 1080, the authentication apparatus outputs authentication failure in operation 1085. When it is determined that the $t^{th}$ frame is not the last frame in operation 1080, the authentication apparatus receives the $(t+1)^{th}$ iris image (frame) and the $(t+1)^{th}$ face image (frame) in operation 1090.

When it is determined that (the filtered iris score, the face score) satisfy the second condition in operation 1050, the authentication apparatus determines whether a fusion score based on (the unfiltered iris score, the face score) satisfies a complex authentication condition in operation 1060. Likewise, it is understood that "whether the fusion score based on (the unfiltered iris score, the face score) satisfies the complex authentication condition" includes "whether the fusion score based on the unfiltered iris score satisfies the complex authentication condition", "whether the fusion score based on the unfiltered face score satisfies the complex authentication condition", and whether the fusion score based on the unfiltered face score and the unfiltered face score satisfies the complex authentication condition." When it is determined that the fusion score does not satisfy the complex authentication condition in operation 1060, in operation 1080, the authentication apparatus determines whether the $t^{th}$ frame is the last frame of which the ordinal number corresponds to the preset number of frames, for example, $t \geq t_{TH}$. When it is determined that the $t^{th}$ frame is the last frame in operation 1080, the authentication apparatus outputs authentication failure in operation 1085. When it is determined that the $t^{th}$ frame is not the last frame in operation 1080, the authentication apparatus receives the $(t+1)^{th}$ iris image (frame) and the $(t+1)^{th}$ face image (frame) in operation 1090.

Figure 11:
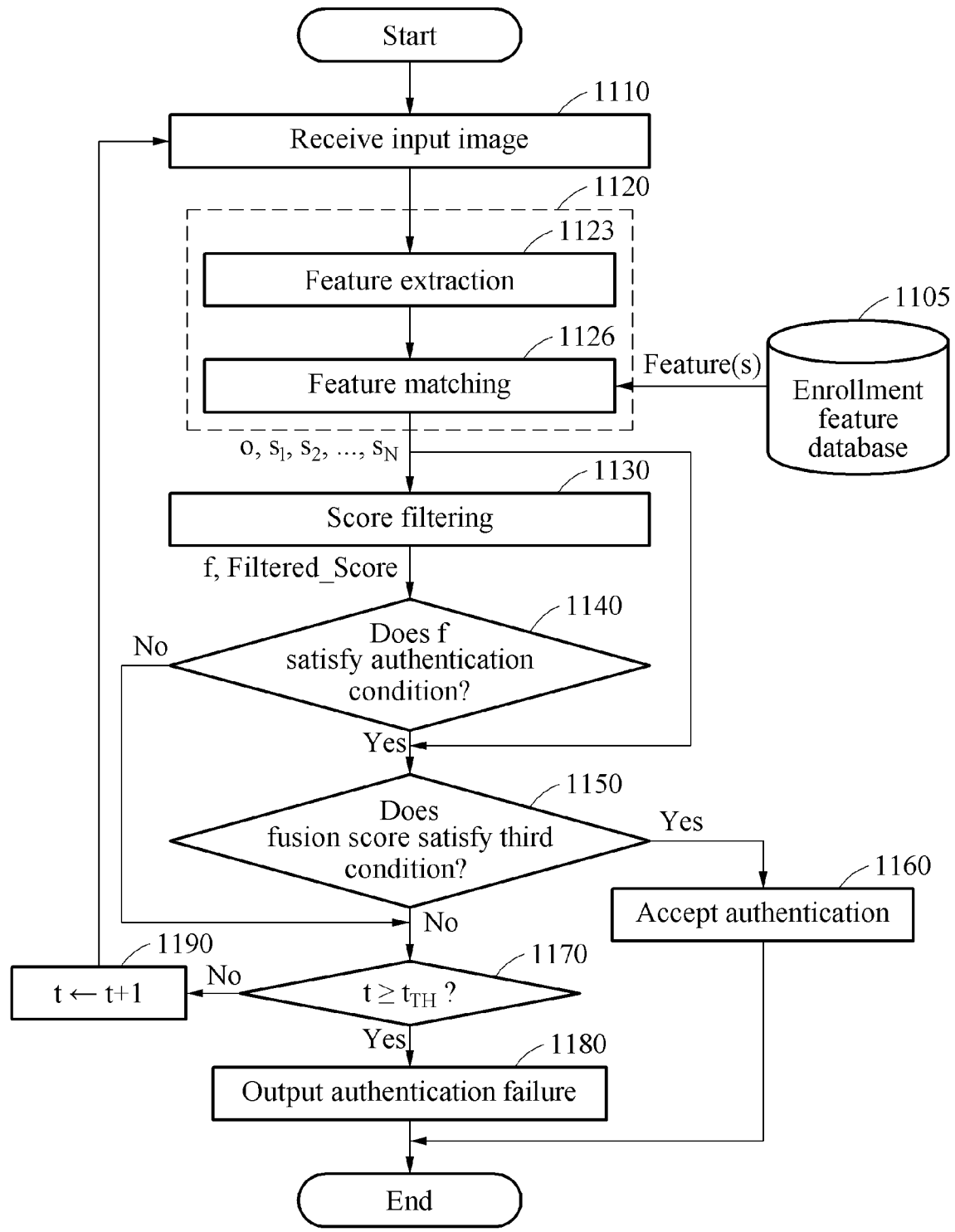

FIG. 11 illustrates an example of a method of performing authentication. Since operations 1110 and 1120 of FIG. 11 are the same as operations 1010 and 1020 of FIG. 10 and operations 1170 through 1190 of FIG. 11 are the same as operations 1080 through 1090 of FIG. 10; repeated description will be omitted.

In operation 1120, authentication apparatus calculates scores s1, s2, . . . , sN for a plurality of features of each modality. The plurality of features corresponds to, for example, a number of iris code bits, a pupil-to-iris ratio, a pupil size, and an iris size of an iris modality, or a full face score and a partial face score of a face modality.

In operation 1130, the authentication apparatus filters the scores s1, s2, . . . , sN for the plurality of features of each modality. In an example, the authentication apparatus filters each of the scores for the plurality of features of the corresponding modality in operation 1130.

In operation 1140, the authentication apparatus determines whether the score filtered in operation 1130, for example, a score f satisfies authentication condition. In this example, the authentication condition is a first condition or a second condition. In operation 1140, the authentication apparatus determines whether each of the filtered scores satisfies the authentication condition or determines whether any one of the filtered scores or a portion of the filtered scores satisfies the authentication condition. When it is determined that the score f does not satisfy the authentication condition, the authentication apparatus outputs authentication failure by performing operations 1170 through 1190 based on whether a $t^{th}$ frame is a last frame of which an ordinal number corresponds to a preset number of frames, or receives a $(t+1)^{th}$ frame.

When it is determined that the score f satisfies the authentication condition, the authentication apparatus calculates a fusion score obtained using a function F and determines whether the fusion score satisfies a third condition for a complex authentication in operation 1150. For example, in operation 1150, the authentication apparatus calculates the fusion score by fusing all of the filtered scores using the function F or calculates the fusion score by fusing any one or a portion of the filtered scores. When it is determined that the fusion score satisfies the third condition for the complex authentication in operation 1150, the authentication apparatus accepts the authentication, for example, the complex authentication in operation 1160. When it is determined that the fusion score does not satisfy the third condition for the complex authentication in operation 1150, the authentication apparatus outputs the authentication failure by performing operations 1170 through 1190 based on whether the $t^{th}$ frame is the last frame of which the ordinal number corresponds to the preset number of frames, or receives the $(t+1)^{th}$ frame.

A condition determination associated with the methods of performing the authentication described with reference to FIGS. 3 through 11 may be variously added or omitted for each combination of modalities.

FIG. 12 illustrates an example of an apparatus for performing authentication. Referring to FIG. 12, authentication apparatus 1200 includes a processor 1210. The authentication apparatus 1200 further includes a memory 1230, a communication interface 1250, and sensors 1270. The processor 1210, the memory 1230, the communication interface 1250, and the sensors 1270 communicate with one another through a communication bus 1205.

The processor 1210 calculates a first score based on a first modality for biometric authentication. The processor 1210 filters the first score. The processor 1210 performs authentication using the first modality based on whether the filtered first score satisfies a second condition for an exclusive authentication entry of the first modality. Here, the second condition is different from a first condition for an exclusive authentication of the first modality.

In an example, the processor 1210 calculates the first score based on the first modality among modalities for the biometric authentication. The processor 1210 filters the first score. The processor 1210 performs authentication using a combination of the modalities based on whether the filtered first score satisfies the second condition for the exclusive authentication entry of the first modality.

The memory 1230 includes an enrollment database including a feature vector for each modality. The memory 1230 includes a volatile memory or a non-volatile memory.

The communication interface 1250 outputs an exclusive authentication result and/or a complex authentication result to a display device 1290 of the authentication apparatus 1200 or outside of the authentication apparatus 1200. The communication interface 1250 receives at least one modality from an external source of the authentication apparatus 1200 or receives information on an environment in which a modality is collected from a user.

The sensors 1270 includes, for example, an image sensor, an infrared sensor, a fingerprint recognition sensor, and a voice recognition sensor. The sensors 1270 collects various modalities.

In addition, the processor 1210 performs the at least one method described with reference to FIGS. 1 through 11 or an algorithm corresponding to the at least one method. The processor 1210 executes a program and controls the authentication apparatus 1200. Program codes executed by the processor 1210 are stored in the memory 1230. The authentication apparatus 1200 is connected to an external device, for example, a personal computer or a network, through an input/output device (not shown), and exchanges data with the external device. The authentication apparatus 1200 includes a smart television, a smart phone, a smart vehicle, and various electronic systems.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile device comprising:
   an infrared (IR) sensor configured to capture a first modality; and
   a processor configured to:
   obtain the first biometric information of a user according to the first modality;
   calculate a first score based on the first biometric information;
   filter the first score;
   determine whether the filtered first score satisfies a second condition; and
   selectively, based on a result of the determining, authenticate the user based on the first score and a first condition corresponding to the first modality,
   wherein the second condition is different from the first condition, the first condition is a first score threshold, and the second condition is a filtered first score threshold.

2. The mobile device of claim 1, wherein the first modality is an iris modality of the user.

3. The mobile device of claim 2, wherein the first score is a fisher score generated based on a combination of various scores representing a quality of an iris image as well as a hamming distance of an iris.

4. The mobile device of claim 1, wherein the first score is a score of a first frame of a plurality of frames corresponding to the first modality, and
   the processor is configured to filter the first score based on scores of frames adjacent to the first frame.

5. The mobile device of claim 4, wherein the processor is configured to filter the scores in units of frame in temporal order.

6. The mobile device of claim 1, wherein the first score comprises a score calculated based on a combination of a plurality of features of the first modality.

7. The mobile device of claim 1, wherein the processor is configured to:
   determine, in response to the first score satisfying the second condition, whether the first score satisfies the first condition; and
   validate the authentication in response to the first score satisfying the first condition.

8. A mobile device comprising:
   an infrared (IR) sensor configured to capture a first modality; and
   a processor configured to:
   obtain a first biometric information of a user according to the first modality among modalities;
   calculate a first score based on the first biometric information;

determine whether the first score satisfies a first condition corresponding the first modality, the first condition being a condition for an exclusive authentication according to the first modality;

filter the first score based on a result of the determining; and selectively, based on whether the filtered first score satisfies a second condition, authenticate the user based on consideration of a plurality of scores respectively calculated according to a plurality of modalities for a complex authentication, wherein the second condition is different from the first condition for a primary authentication of the first modality, the first condition is a first score threshold, and the second condition is a filtered first score threshold.

9. The mobile device of claim 8, wherein the first condition and the second condition are determined based on any one or any combination of a feature distance by the modalities, a normalized cross correlation (NCC) between feature vectors of the modalities, and a matching score between the feature vectors.

10. The mobile device of claim 8, wherein in response to the determination indicating that the first score satisfies the first condition, the processor is configured to authenticate the user.

11. The mobile device of claim 10, wherein the first modality is an iris modality of a user.

12. The mobile device of claim 11, wherein the complex authentication is any two or more of a fingerprint modality, an iris modality, and a face modality of a user.

13. The mobile device of claim 8, wherein
the first score is a score of a first frame of a plurality of frames corresponding to the first modalities, and
the processor is configured to filter the first score based on scores of frames adjacent to the first frame.

14. The mobile device of claim 8, wherein the first score comprises a score calculated based on a combination of a plurality of features of the first modality.

15. The mobile device of claim 14, wherein in response to the first modality being an iris modality, the plurality of features correspond to feature vectors that include a number of iris code bits, a pupil-to-iris ratio, a pupil size, and an iris size.

16. The mobile device of claim 8, wherein the processor is configured to:
perform the primary authentication using the first score; and
filter the first score in response to the primary authentication failing.

17. The mobile device of claim 16, wherein
the processor is further configured to calculate a second score based on a second biometric information of the user according to the second modality different from the first modality and filtering the second score, and
the combination of the modalities comprises the first modality and the second modality.

18. The mobile device of claim 8, further comprising:
a camera configured to capture a second modality.

19. The mobile device of claim 18, wherein the second modality is a face modality of the user.

20. The mobile device of claim 18, wherein the processor is configured to:
calculate a third score by fusing the first score and the second score; and
perform the complex authentication based on whether the third score satisfies a third condition for the complex authentication.

21. The mobile device of claim 8, wherein the modalities comprise any one or any combination of any two or more of a face image, a fingerprint image, an iris image, a vein image, a palm-line image, a sign, a voice, a gait, a deoxyribonucleic acid (DNA) structure of a user.

* * * * *